United States Patent
Pan (10) Patent No.: US 9,729,811 B2
(45) Date of Patent: Aug. 8, 2017

(54) SMART TV SYSTEM AND INPUT OPERATION METHOD

(71) Applicant: WISTRON CORP., New Taipei (TW)

(72) Inventor: Shao-Wei Pan, New Taipei (TW)

(73) Assignee: Wistron Corp., New Taipei (TW)

( * ) Notice: Subject to any disclaimer, the term of this patent is extended or adjusted under 35 U.S.C. 154(b) by 270 days.

(21) Appl. No.: 13/831,019

(22) Filed: Mar. 14, 2013

(65) Prior Publication Data

US 2013/0291015 A1 Oct. 31, 2013

(30) Foreign Application Priority Data

Apr. 27, 2012 (TW) .............................. 101115083 A (51) Int. Cl.
*H04N 5/44* (2011.01)
*H04N 21/41* (2011.01)
*H04N 21/422* (2011.01)

(52) U.S. Cl.
CPC ....... *H04N 5/4403* (2013.01); *H04N 21/4126* (2013.01); *H04N 21/42214* (2013.01); *H04N 2005/4419* (2013.01); *H04N 2005/4425* (2013.01)

(58) Field of Classification Search
CPC ............. G08C 2201/92; G08C 2201/93; H03J 2200/22; H03J 2200/23; H03J 2200/24; H03J 2200/25; H03J 2200/26; H04N 2005/4408; H04N 2005/4407; H04N 2005/441; H04N 2005/4414; H04N 2005/4416; H04N 2005/4417; H04N 2005/4419; H04N 2005/4425

USPC .................................. 345/173; 715/700, 705
See application file for complete search history.

(56) References Cited

U.S. PATENT DOCUMENTS

| | | | |
|---|---|---|---|
| 2006/0184974 A1* | 8/2006 | Sakao et al. ..................... 725/80 |
| 2007/0209049 A1* | 9/2007 | Kelly ..................... H04N 7/173 |
| | | | 725/53 |
| 2009/0150553 A1* | 6/2009 | Collart et al. ................ 709/229 |
| 2010/0103127 A1* | 4/2010 | Park et al. ..................... 345/173 |

(Continued)

FOREIGN PATENT DOCUMENTS

| CN | 101771834 A | 7/2010 |
|---|---|---|
| CN | 101957710 A | 1/2011 |

OTHER PUBLICATIONS

Taiwan Patent Office, Office Action, Patent Application Serial No. 101115083, dated Mar. 10, 2015, Taiwan.

(Continued)

*Primary Examiner* — Rong Le (57) ABSTRACT

A smart TV is provided. The smart TV has a network interface, configured to connect the smart TV with a mobile device via a network; and a processing unit, configured to execute a first remote virtual keyboard application for activating a remote virtual keyboard mode of the smart TV; wherein the processing unit further generates an input interface comprising a first virtual keyboard when the smart TV generates an input column in response to an input demand; wherein when the remote virtual keyboard mode of the smart TV is activated and there is the input demand, the processing unit hides the first virtual keyboard without being displayed, and uses the mobile device to replace the hidden first virtual keyboard for accepting input from a user.

43 Claims, 7 Drawing Sheets

(56) References Cited

U.S. PATENT DOCUMENTS

2010/0156939 A1\* 6/2010 Lee .................. G06F 1/1626
                                                    345/650
2013/0113993 A1\* 5/2013 Dagit, III ............ G06F 3/017
                                                    348/552
2013/0231144 A1\* 9/2013 Daniel et al. ............. 455/466

OTHER PUBLICATIONS

China Patent Office, Office Action, Patent Application Serial No. 201210148375.3, dated Dec. 23, 2015, China.
China Patent Office, Office Action, Patent Application Serial No. 201210148375.3, dated Jun. 14, 2016, China.

\* cited by examiner

SMART TV SYSTEM AND INPUT OPERATION METHOD

CROSS REFERENCE TO RELATED APPLICATIONS

This Application claims priority of Taiwan Patent Application No. 101115083, filed on Apr. 27, 2012, the entirety of which is incorporated by reference herein.

BACKGROUND OF THE INVENTION

Field of the Invention

The present invention relates to display systems, and in particular relates to a display system, a smart TV, a mobile device and an input operation method by using a mobile device to replace a virtual keyboard of the smart TV.

Description of the Related Art

With the advent of technologies, smart TVs have become increasingly popular. However, the major difference between a smart TV and a conventional TV is that the smart TV may connect to a network to retrieve information from the network, placing orders or shopping for video/music/gaming products, facilitating community interaction, or using resources from cloud services. The smart TV may also display or manage multimedia files, or access or manage data, and thus there is usually an input demand for inputting characters or numbers to the smart TV.

However, when a user wants to input characters on the smart TV, the conventional way is to use the five-direction keys on the remote controller to select and input the characters and numbers on a virtual keyboard displayed on the screen of the smart TV. Accordingly, the user has to perform many steps to input a desired word, and thus it is annoying and time consuming to perform these operations.

In addition, when there is an input demand from a user for inputting characters to the smart TV, the smart TV may automatically display a virtual keyboard on its screen for being selected and entered. In practice, however, the virtual keyboard may often occupy a large portion of the display screen, and thus the user may not be able to view complete information displayed on the screen. If the user wants to input corresponding words by referring to the guiding information on the display screen, the user has to cancel the input interface, so that the virtual keyboard disappears and the user is able to view the information on the display screen. Then, the user has to move the cursor to the location for inputting words, so that the smart TV may recall the virtual keyboard. Accordingly, there is a demand for a display system to improve the aforementioned deficiencies, thereby reducing the time for inputting characters by the user and solving the problem whereby the display screen is occupied by the virtual keyboard.

BRIEF SUMMARY OF THE INVENTION

A detailed description is given in the following embodiments with reference to the accompanying drawings.

In an exemplary embodiment, a smart TV is provided. The smart TV comprises a network interface, configured to connect the smart TV with a mobile device via a network; and a processing unit, configured to execute a first remote virtual keyboard application for activating a remote virtual keyboard mode of the smart TV; wherein the processing unit further generates an input interface comprising a first virtual keyboard when the smart TV generates an input column and there is an input demand; wherein when the remote virtual keyboard mode of the smart TV is activated and there is the input demand, the processing unit hides the first virtual keyboard without being displayed, and uses the mobile device to replace the hidden first virtual keyboard for accepting input from a user.

In another exemplary embodiment, an input operation method applied in a smart TV is provided. The method comprises the following steps of: utilizing the smart TV to execute a first remote virtual keyboard application to generate an input interface comprising a first virtual keyboard when the smart TV generates an input column and there is an input demand; connecting the smart TV to a mobile device via a network; determining whether a second remote virtual keyboard application corresponding to the first remote virtual keyboard application is installed on the mobile device; activating a remote virtual keyboard mode of the smart TV and the mobile device when the mobile device executes the second remote virtual keyboard application; and, when the remote virtual keyboard mode of the smart TV and the mobile device is activated and there is the input demand, hiding the first virtual keyboard and replacing the first virtual keyboard with the mobile device for accepting input from a user.

In yet another exemplary embodiment, a smart TV system is provided. The smart TV system comprises: a smart TV, configured to execute a first remote virtual keyboard application to activate a remote virtual keyboard mode of the smart TV; wherein when the smart TV further generates an input interface comprising a first virtual keyboard when the smart TV generates an input column and there is an input demand; and a mobile device, connected to the smart TV via a network, wherein the mobile device executes a second remote virtual keyboard application corresponding to the first remote virtual keyboard application to support the remote virtual keyboard mode of the smart TV, wherein when the remote virtual keyboard mode of the smart TV and the mobile device is activated and there is the input demand, the smart TV hides the first virtual keyboard without being displayed, and replaces the hidden first virtual keyboard with the mobile device for accepting input from a user.

In yet another exemplary embodiment, an input operation method applied in a smart TV system comprising a smart TV and a mobile device is provided. The method comprises the following steps of: utilizing the smart TV to execute a first remote virtual keyboard application to generate an input interface comprising a first virtual keyboard when the smart TV generates an input column and there is an input demand; connecting the smart TV to a mobile device via a network; determining whether a second remote virtual keyboard application corresponding to the first remote virtual keyboard application is installed on the mobile device; activating a remote virtual keyboard mode of the smart TV and the mobile device when the mobile device executes the second remote virtual keyboard application; and when the remote virtual keyboard mode of the smart TV and the mobile device is activated and there is the input demand, hiding the first virtual keyboard and replacing the first virtual keyboard with the mobile device for accepting input from a user.

In yet another exemplary embodiment, a mobile device is provided. The mobile device is used to match a smart TV comprising a first virtual keyboard and a first remote virtual keyboard application for activating a remote virtual keyboard mode. The mobile device comprises: a network interface, configured to connect the mobile device to the smart TV via a network; a second remote virtual keyboard application, corresponding to the first remote virtual keyboard application of the smart TV; a processing unit, configured to execute the second remote virtual keyboard application to activate a remote virtual keyboard mode of the mobile device corresponding to the remote virtual keyboard mode of the smart TV; wherein when the respective remote virtual keyboard mode of the mobile device and the smart TV is activated and there is an input demand on the smart TV, the smart TV hides the first virtual keyboard and replaces the first virtual keyboard with the mobile device for accepting input from a user.

In yet another exemplary embodiment, an input operation method applied in a mobile device is provided, wherein the mobile device matches a smart TV comprising a first virtual keyboard and a first remote virtual keyboard application for activating a remote virtual keyboard mode. The method comprises the following steps of: connecting the mobile device to the smart TV via a network; utilizing the mobile device to execute a second remote virtual keyboard application corresponding to the first remote virtual keyboard application for activating a remote virtual keyboard mode of the mobile device corresponding to the remote virtual keyboard mode of the smart TV; determining whether the respective remote virtual keyboard mode of the mobile device and the smart TV is activated; determining whether there is an input demand on the smart TV; and when there is the input demand on the smart TV, utilizing the smart TV to hide the first virtual keyboard and replacing the hidden first virtual keyboard with the mobile device for accepting input from a user.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
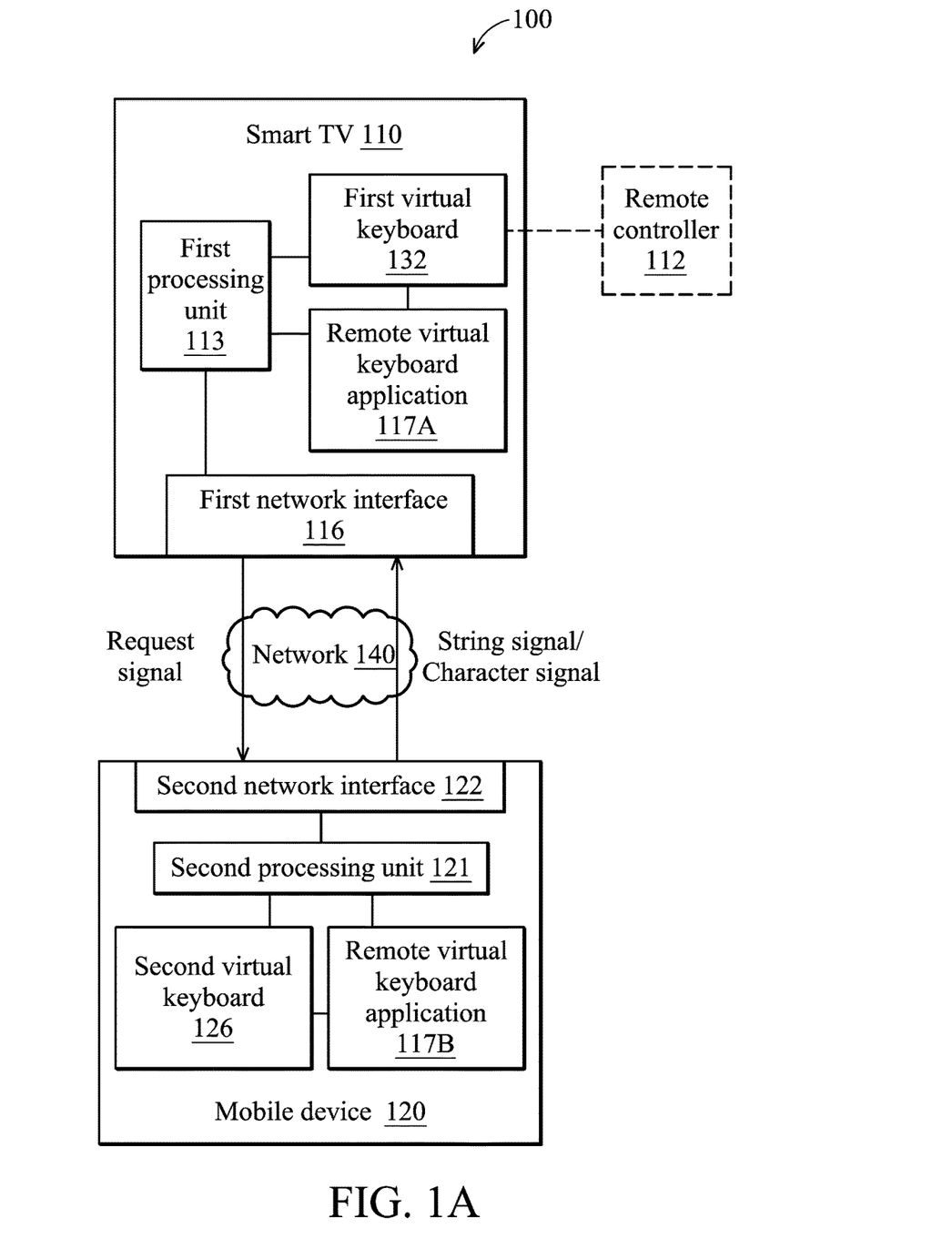
FIG. 1A illustrates a block diagram of the smart TV system according to an embodiment of the invention.
Figure 1B:
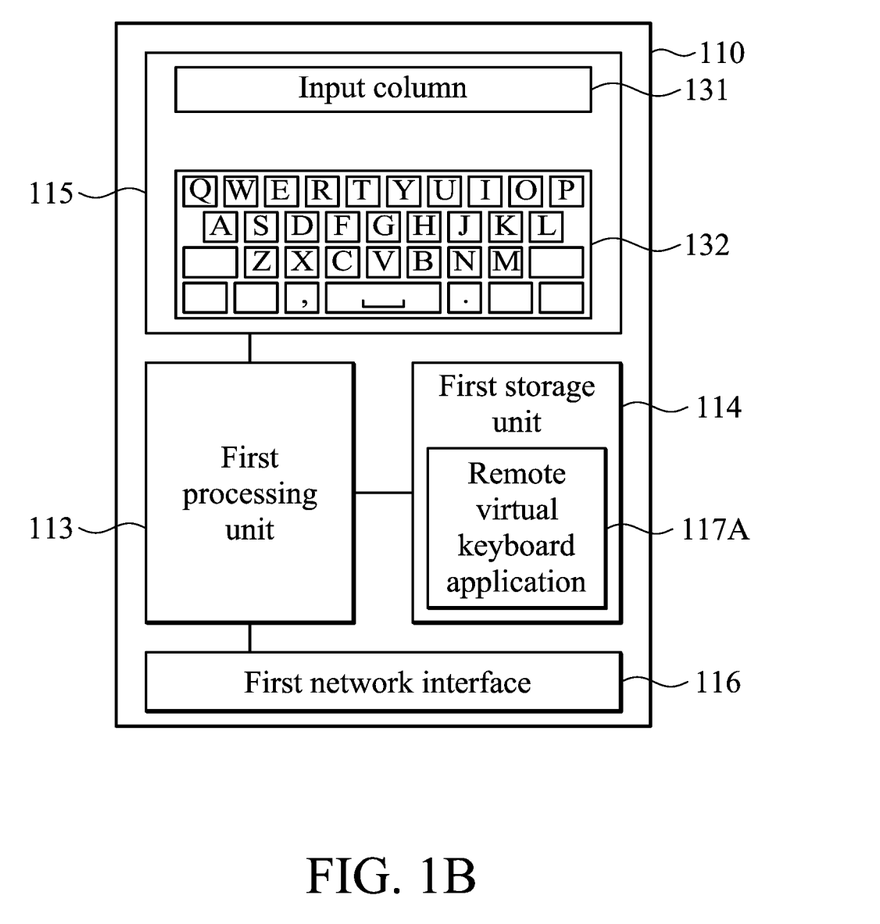
FIG. 1B illustrates a block diagram of the smart TV according to an embodiment of the invention.

FIG. 1A illustrates a block diagram of the smart TV system according to an embodiment of the invention. FIG. 1B illustrates a block diagram of the smart TV according to an embodiment of the invention. The smart TV system 100 may comprise a smart TV 110 and a mobile device 120. The smart TV 110 and the mobile device 120 connect to each other via a network 140, and the smart TV 110 and the mobile device 120 are located in the same local network or home network. The smart TV 110 is configured to display TV programs and network videos, or browsing websites on the internet.

Figure 1C:
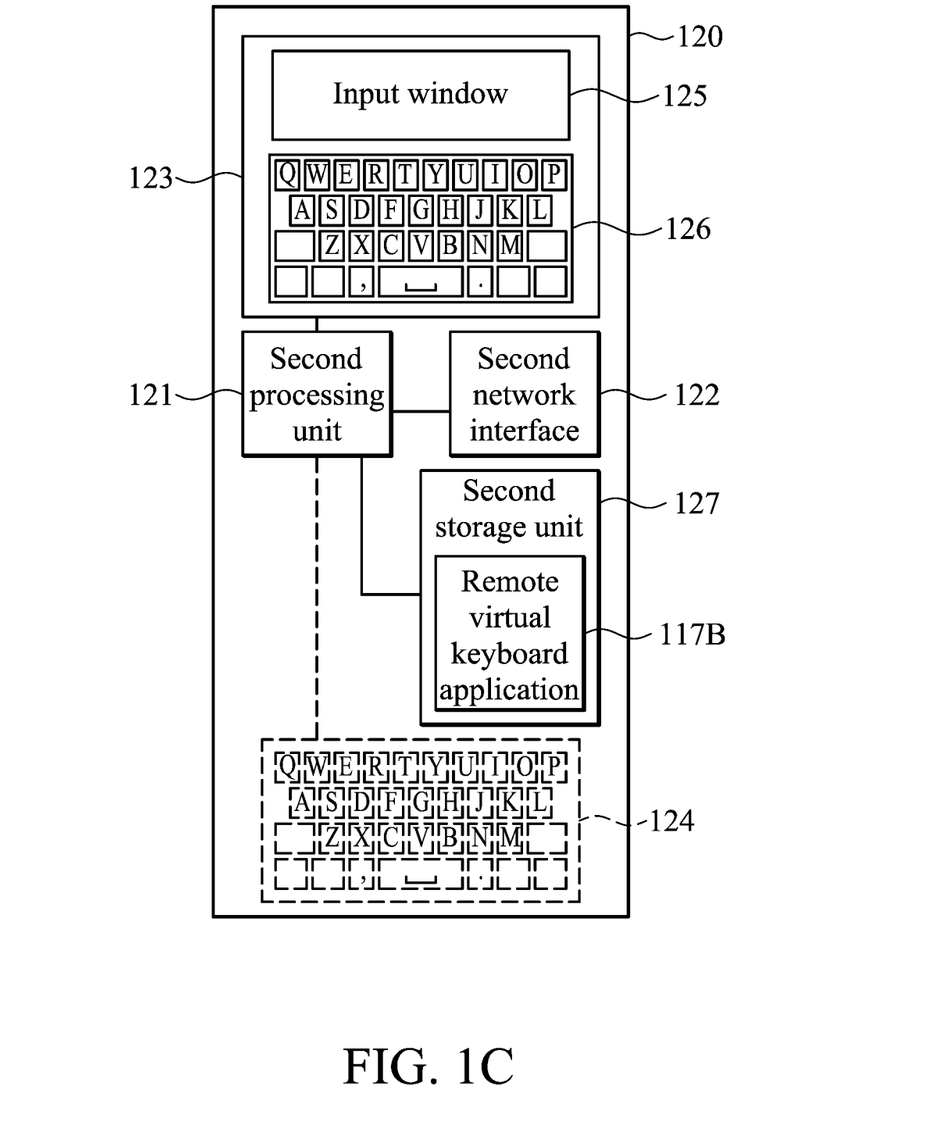
FIG. 1C illustrates a block diagram of the smart TV system according to another embodiment of the invention.

In an embodiment, the smart TV 110 may comprise a first virtual keyboard 132 and execute a remote virtual keyboard application 117 to support a remote virtual keyboard mode. In another embodiment, the smart TV 110 may optionally comprise a remote controller 112 configured to control and operate every functionality of the smart TV 110. When an input column 131 is displayed on the display screen of the smart TV 110 and there is an input demand from the user (i.e. inputting at least one character in the input column 131), the user may use the conventional method to recall the first virtual keyboard 132 and use the remote controller 112 to control the first virtual keyboard 132 to input characters. The remote virtual keyboard application 117A executed by the smart TV 110 may detect the mobile device 120, which also executes a remote virtual keyboard application 117B and supports the remote virtual keyboard mode, located in the same network domain. Then, the smart TV 110 may connect to the mobile device 120 via the first network interface 116 and the second network interface 120. After activating the remote virtual keyboard mode of the smart TV 110, the remote keyboard application 117A may hide the first virtual keyboard 132 (as illustrated in FIG. 1B) of the first input interface only or hide the first input interface, and the first virtual keyboard 132 of the smart TV 110 is replaced by a second virtual keyboard 126 or a keyboard 124 (as illustrated in FIG. 1C) of the mobile device 120. Alternatively, the first input interface can be replaced by a second input interface (e.g. comprising the second virtual keyboard 126 or the keyboard 124). Then the user may input characters on the mobile device 120 (e.g. by the keyboard 124 or the second virtual keyboard 126). For example, the mobile device 120 can be a tablet PC, a smart phone, or other network accessible electronic devices equipped with a keyboard or a virtual keyboard.

It should be noted that, an input demand on the smart TV from the user may indicate that the application or service currently executed by the smart TV are provided for inputting characters such as text, numbers or a web address, or indicate that the next service is suspended until characters such as text or numbers are inputted by the user. The application or service may actively display an input column or a notification message to guide the user to input corresponding characters. In addition, the user may also actively notify the smart TV that there is an input demand by sending a control signal to the smart TV 110 from the remote controller 112, or performing image recognition (e.g. gesture recognition) or sound recognition by an external device (e.g. a camera or microphone).

Specifically, as illustrated in FIG. 1B, the smart TV 110 may comprise a first processing unit 113, a first storage unit 114, a display screen 115, and a first network interface 116. The first processing unit 113 is configured to execute a remote virtual keyboard application 117A stored in the first storage unit 114 to activate the remote virtual keyboard mode of the smart TV 110. The first processing unit 113 may receive a signal to generate a first input interface (e.g. comprising the input column 131 and the first virtual keyboard 132, or merely comprising the first virtual keyboard 132) of the smart TV 110, and display TV programs on the display screen 115. For example, when there is an input demand from the user, the user may send a control signal to the first processing unit 113 via the application or service currently executed by the smart TV 110 or by using the remote controller 112, so that the processing unit 113 may display the first virtual keyboard 132 on the display screen 115. In addition, the smart TV 110 may connect to the internet via the first network interface 116 (e.g. via TCP/IP protocol), and connect to the mobile device 120 via the first network interface 116 (e.g. via UPnP or 802.11x protocols) at the same time.

In an embodiment, when the smart TV 110 boots up, the first processing unit 113 may execute the remote virtual keyboard application 117A stored in the first storage unit 114, and determine whether any other mobile device has been connected in the same network domain (e.g. via the first network interface 116 with UPnP or 802.11x protocols). When there are other mobile devices have been connected, the first processing unit 113 may further determine whether the connected mobile devices (e.g. the mobile device 120) support the virtual keyboard mode. That is, the first processing unit 113 may determine whether a remote virtual keyboard application 117B corresponding to the remote virtual keyboard application 117A of the smart TV is installed on the mobile device 120. When the first processing unit 113 determines that the remote virtual keyboard application 117B is installed on the mobile device 120, the smart TV 110 and the mobile device 120 may activate the corresponding virtual keyboard mode simultaneously. Specifically, in the embodiment, the smart TV 110 is a control terminal. That is, the smart TV 110 and the mobile device 120 are under the corresponding virtual keyboard mode (i.e. the respective virtual keyboard mode is activated). When there is an input demand on the smart TV from the user, the first processing unit 113 may hide the first virtual keyboard 132 and transmit a request signal to the mobile device 120 via the network, thereby activating the input interface of the mobile device 120 (e.g. the second virtual keyboard 126 and/or the input window 125 of the mobile device 120). In other words, the mobile device 120 passively activates its input interface according to the request signal from the first processing unit 113.

FIG. 1C illustrates a block diagram of the mobile device 120 according to an embodiment of the invention. In an embodiment, the mobile device 120 may comprise a second processing unit 121, a second network interface 122, a display unit 123, and a second storage unit 127, wherein the second storage unit 127 stores a remote virtual keyboard application 117B corresponding to the remote virtual keyboard application 117A. In an embodiment, the mobile device 120 may optionally comprise a keyboard 124. For example, the second processing unit 121 may be a CPU. The second network interface 122 may support interfaces such as UPnP, Wifi, Bluetooth, and 802.11x, etc. The display unit 123 may be a display (e.g. LCD or LED display) or a touch-sensitive screen, but the invention is not limited thereto.

In the aforementioned embodiment, the second processing unit 121 may also execute the remote virtual keyboard application 117B to activate the mobile device 120 to be executed under a remote virtual keyboard mode. The mobile device 120 may connect to the smart TV 110 by the second network interface 122 via a network (e.g. a local network using UPnP or 802.11x protocols). Specifically, when the mobile device 120 does not comprise the keyboard 124 and the user has an input demand on the smart TV 110, the second processing unit 121 may display the input interface (comprising the input window 125 and the second virtual keyboard 126, or merely comprising the second virtual keyboard 126) of the mobile device 120 on the display unit 123. Then, the user may select the characters to be inputted on the display unit 123 (e.g. a touch-sensitive screen), and the inputted characters are displayed in the input window 125. Alternatively, when the mobile device 120 comprises the keyboard 124 and the user has an input demand on the smart TV 110, the second processing unit 121 merely displays the corresponding input window 125 on the display unit 123. Then, the user may input characters by the keyboard 124 of the mobile device 120. Conversely, if the user has no input demand on the smart TV 110, the second processing unit 121 may hide the input window 125 and the second virtual keyboard 126.

Figure 1D:
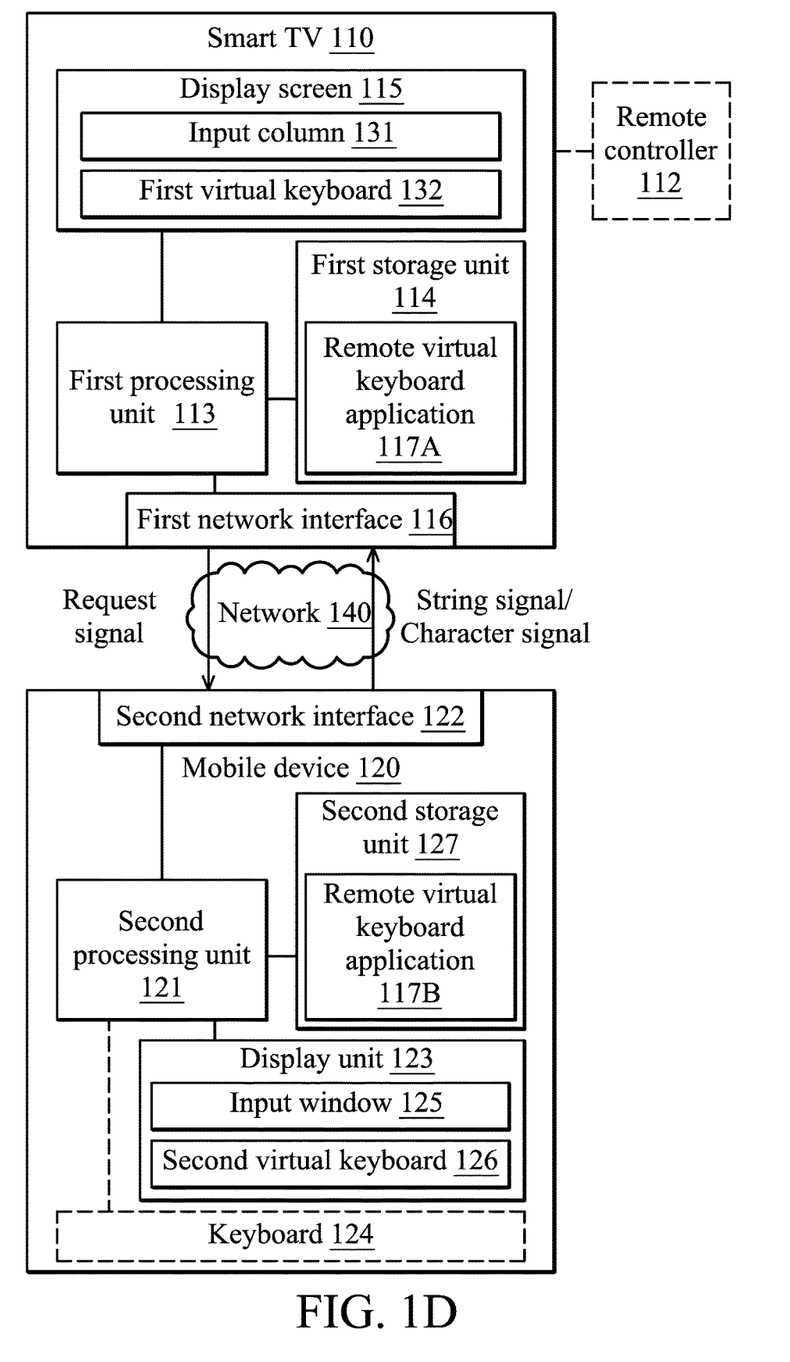
FIG. 1D illustrates a detailed block diagram of the smart TV system according to an embodiment of the invention.

FIG. 1D illustrates a detailed block diagram of the smart TV system according to an embodiment of the invention. For those skilled in the art, it should be appreciated that FIG. 1A is a simplified block diagram illustrating necessary components for implementation. Also, the detailed connection between each component of the smart TV system 100 is illustrated in FIG. 1D. It is noted that the functionality of each component in FIG. 1D is described in the aforementioned embodiments of FIG. 1A to 1C, and the details will not be described here.

Figure 1E:
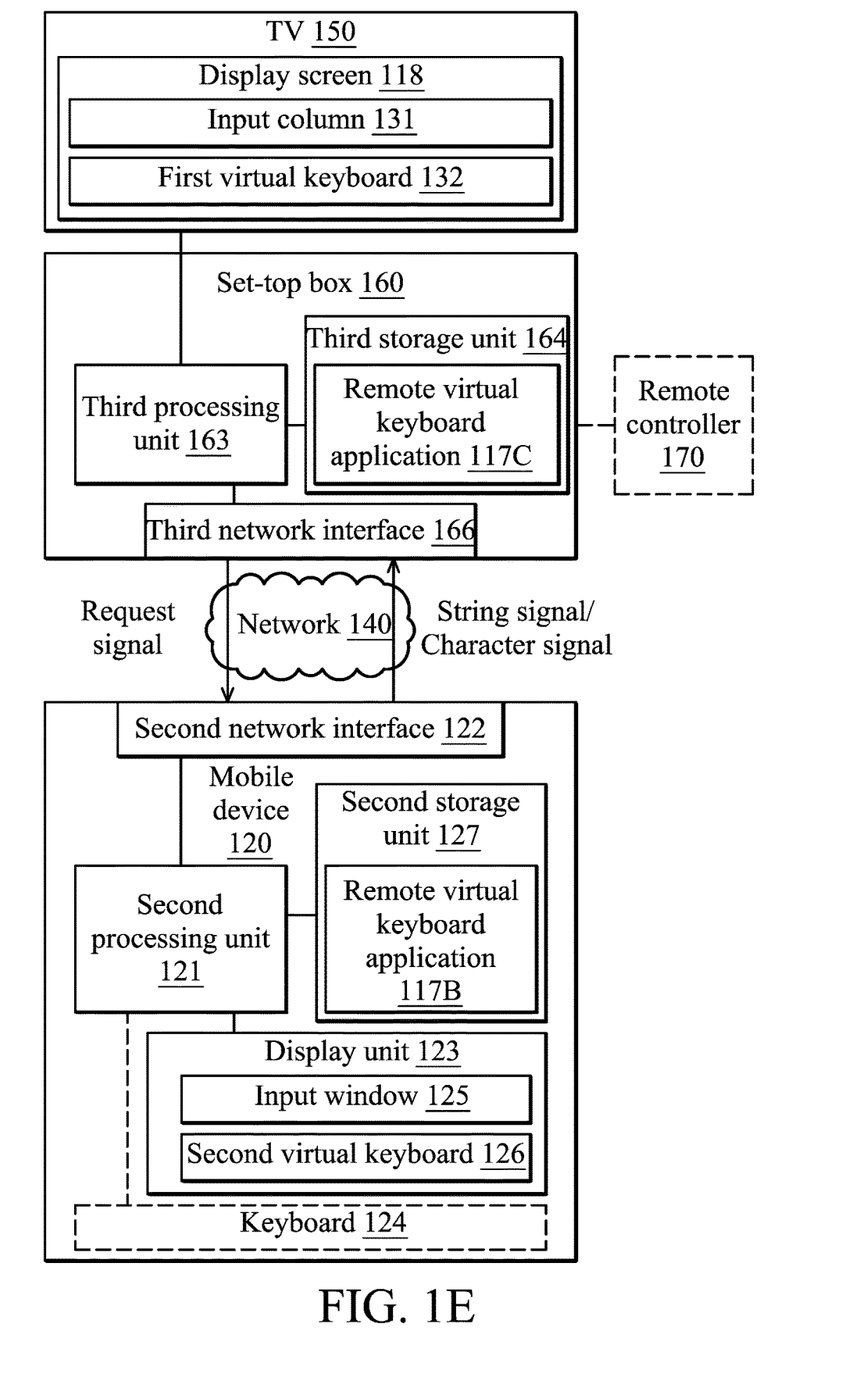
FIG. 1E illustrates a detailed block diagram of the smart TV system according to another embodiment of the invention.

FIG. 1E illustrates a block diagram of the smart TV system according to another embodiment of the invention. In the embodiment of FIGS. 1A and 1D, the smart TV system 100 may comprise the smart TV 110 and the mobile device 120. However, the smart TV 110 can be replaced by a TV 150 and a set-top box 160, wherein the TV 150 and the set-top box 160 are connected via a display interface (e.g. AV, components, HDMI, or DVI interfaces). Specifically, as illustrated in FIG. 1E, the set-top box 160 may comprise each corresponding component of the smart TV 110 except the display screen 115, such as a third processing unit 163, a third storage unit 164 (i.e. storing a remote virtual keyboard application 117C), and a third network interface 166, which have the same functionality as the first processing unit 113, the third storage unit 114, and the first network interface 116 of the smart TV 110, respectively. The user may optionally use a remote controller 170 to control and operate the set-top box 160. The TV 150 is used to replace the display screen 115 of the smart TV 110. In other words, the display screen 118 of the TV 150 can be used to display the pictures of the smart TV 110, the input column 131, and the first virtual keyboard 132 (i.e. the input column 131 and the first virtual keyboard 132 can be regarded as the first input interface). The connection and operation between each component in FIG. 1E can be referred to in the aforementioned embodiments, and the details will not be described here.

In the following embodiments, different input methods using the second virtual keyboard 126 or the keyboard 124 of the mobile device 120 are described. When the user inputs every single input character on the mobile device 120, the mobile device 120 may immediately transmit a character signal comprising each input character to the smart TV via the second network interface 122 connecting to the network. Then, the smart TV 110 may immediately and synchronously display the transmitted input character on its input column 131. In another embodiment, after inputting a plurality of input characters on the input interface of the mobile device 120 and the input characters have been confirmed by the user (e.g. pressing the "Enter" button on the second virtual keyboard 126 or the keyboard 124), the mobile device 120 may transmit a string signal comprising all the input characters (e.g. a character string) to the smart TV 110. Then, the first processing unit 113 of the smart TV 110 may display all the received input characters on the input column 131. It should be noted that, in the aforementioned embodiments, no matter whether the mobile device 120 comprises the keyboard 124 or not, the mobile device 120 may immediately transmit the character signal comprising the input character, or the string signal comprising the inputted complete character string.

In the invention, when the user has an input demand on the smart TV 110, there are several advantages to input characters via the input interface of the mobile device 120. First, the operation may increase the convenience for inputting characters. For example, if the user inputs input characters on the smart TV 110 by the remote controller 112, it may take many steps and time to complete this operation. In addition, the first virtual keyboard 132 of the smart TV 110 may occupy a large portion of the screen, so that the user can not view the complete information display on the screen. Accordingly, if the first virtual keyboard 132 of the smart TV 110 is hidden and the input interface of the mobile device 120 (e.g. a tablet PC) can be used to input characters, it may significantly increase the convenience for inputting characters without affecting the comfort of the user for viewing the digital TV content. Second, the user may define the language settings of the second virtual keyboard 126 freely without being limited by the language settings of the smart TV 110. In other words, the number of built-in languages in the smart TV 110 is often very limited. It can be annoying when a user wants to use a language other than the built-in languages of the smart TV 110. On the other hand, the mobile device 120 often has a larger number of language settings. Therefore, the user may define the language setting of the second virtual keyboard 126 of the mobile device 120 freely without being limited by the language settings of the first virtual keyboard 132 of the smart TV 110 in the invention.

In an embodiment, if the smart TV 110 and the mobile device 120 connect to each other with the UPnP (Universal Plug and Play) protocol, the smart TV 110 can be regarded as a control point of the UPnP protocol. After the smart TV 110 boots up, the first processing unit 113 may detect whether any DHCP servers exist in the same network. If so, the first processing unit 113 may use the DHCP protocol with high priority to obtain an IP address. If not, the first processing unit 113 may use the "Auto-IP" settings. Meanwhile, the first processing unit 113 may keep detecting whether any DHCP servers appear in the same network. If so, the DHCP protocol is used. When the mobile device 120 is joining the UPnP network on which the smart TV 110 is located, the second processing unit 121 may transmit a notification message to the first processing unit 113 to indicate the presence of the mobile device 120. The notification message may comprise the type, ID codes, and address of the description document of the mobile device 120. Then, the second processing unit 121 may further transmit the description document (e.g. XML document) of the mobile device 120 to the first processing unit 113, wherein the description document may comprise the device name, serial number, manufacturer, condition parameters, URL address for controlling the mobile device 120, etc, but the invention is not limited thereto. After the first processing unit 113 retrieves the description document of the mobile device 120, it indicates that the smart TV 110 may control the mobile device 120. In the embodiment, the smart TV 110 may transmit a request signal to the mobile device 120 to recall the input interface (e.g. the input window 125 and/or the second virtual keyboard 126) of the mobile device 120. When the user selects input characters on the mobile device 120, the mobile device 120 may transmit a character signal or a string signal comprising the input character(s) to the smart TV 110, thereby displaying the input characters on the input column 131 of the smart TV 110.

Figure 2A:
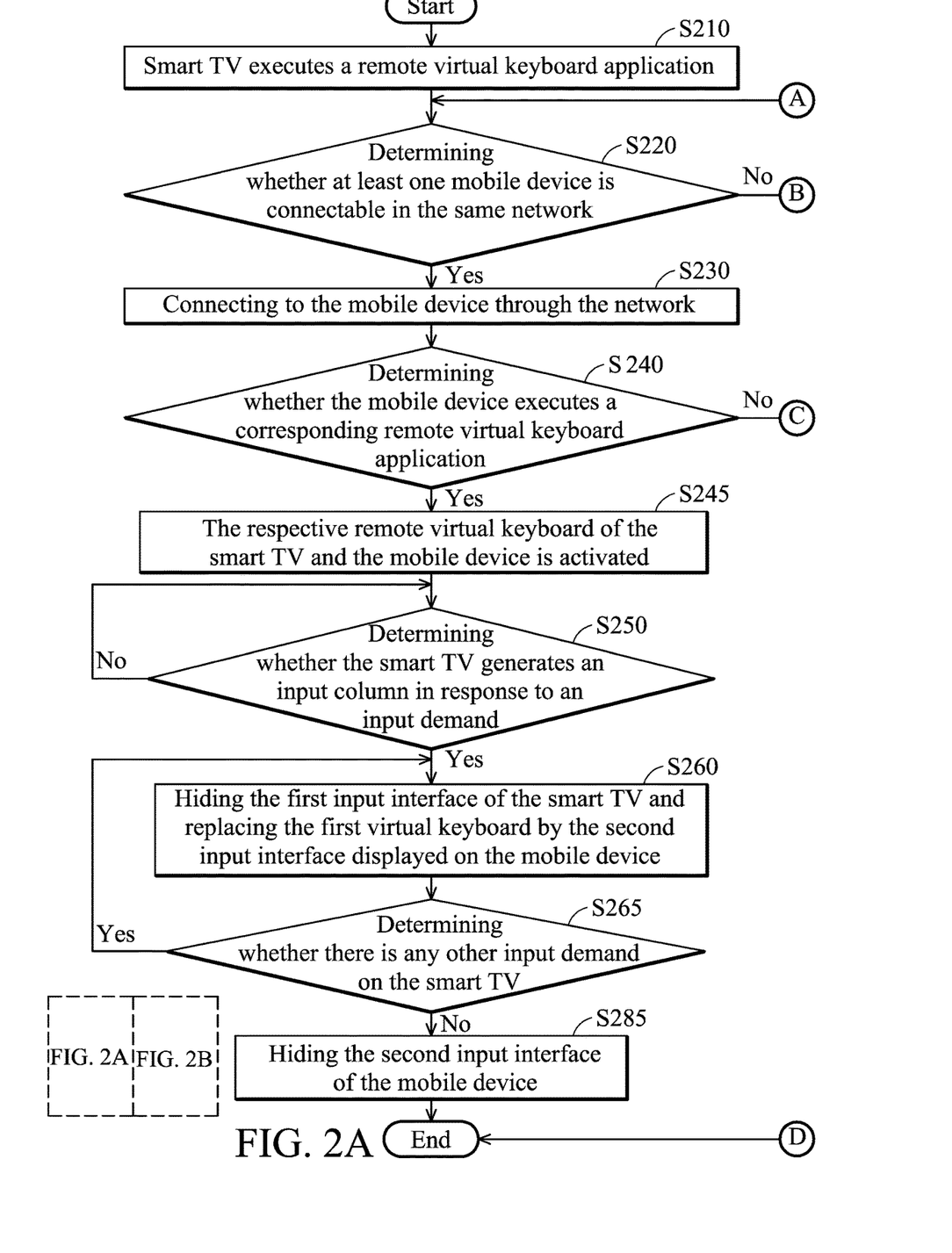
FIGS. 2A and 2B illustrate a flow chart of the input operation method according to an embodiment of the invention.
Figure 2B:
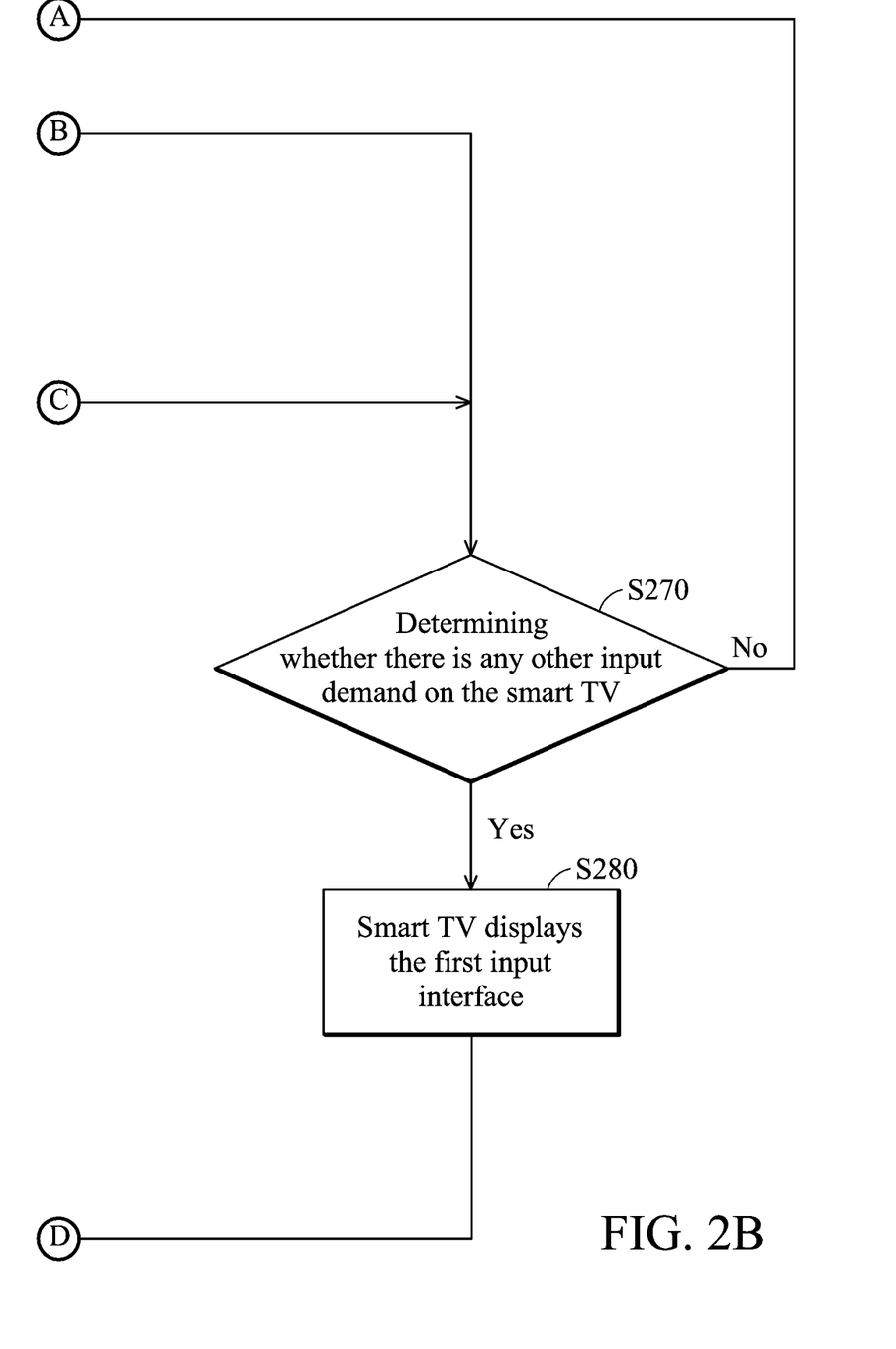

FIGS. 2A and 2B illustrate a flow chart of the input operation method according to an embodiment of the invention. Referring to FIGS. 1A-1C and FIG. 2, in step S210, when the smart TV 110 boots up, the smart TV 110 may execute the remote virtual keyboard application 117A (i.e. can be a "terminate & stay resident" (TSR) program), wherein the smart TV 100 may comprise a first input interface comprising the input column 131 and the first virtual keyboard 132, or merely comprising the first virtual keyboard 132. In step S220, the smart TV 110 may determine whether at least one connectable mobile device (e.g. mobile device 120) exists in the same specific network (e.g. the same local network or home network). In step S230, when the mobile device 120 exists, the smart TV 110 may connect to the mobile device 120 via the specific network. In step S240, the smart TV may determine whether the corresponding remote virtual keyboard application 117B is installed on the mobile device 120. In step S245, when it is determined that the corresponding remote virtual keyboard application 117B is installed on the mobile device 120, the smart TV 110 and the mobile device 120 may activate a corresponding virtual keyboard mode simultaneously. In step S250, the smart TV 110 may further determine whether there is an input demand on the smart TV 110. In step S260, when it is determined that there is an input demand on the smart TV 110, the smart TV 110 may hide its first input interface (i.e. comprising first virtual keyboard 132 and the input column 131), and replace the first input interface by displaying a second input interface (i.e. comprising the second virtual keyboard 126) on the mobile device 120 or activating the keyboard 124 of the mobile device 120. In step S265, the smart TV 110 may keep detecting whether there is any input demand on the smart TV. If so, step S260 is performed. If not, step S285 is performed, and the smart TV 110 may inform the mobile device 120 to hide the second input interface.

Conversely, in steps S220 or S240, if the mobile device 120 is not found in the same specific network or the mobile device 120 is found without installing the corresponding remote virtual keyboard application 117B, step S270 is performed and the smart TV 110 may keep waiting and determining whether there is any input demand. If so, the smart TV 110 may directly display the first input interface to input characters in the conventional way (step S280).

For those skilled in the art, it should be appreciated that the smart TV 110 and mobile device 120 should operate with each other, so that the mobile device 120 can be used to replace the first virtual keyboard 132. It should be noted that the remote virtual keyboard applications 117A and 117B of the invention can be integrated into other applications having input demands, or implemented by deriving from the operating system. That is, the smart TV 110 may execute different programs. If the user has an input demand, the smart TV 110 may use the mobile device 120 (e.g. the second input interface), which has been connected to the smart TV 110 and has installed the remote virtual keyboard application 117B, to replace the first input interface (e.g. comprising the first virtual keyboard 132 and the input column 131) of the smart TV 110.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A smart TV capable of communicating with a mobile device having a second input interface, comprising:
   a display screen;
   a network interface, configured to connect the smart TV with the mobile device via a network; and
   a processor, configured to generate a first input interface displayed on the display screen comprising a first virtual keyboard when the smart TV generates an input column displayed on the display screen in response to an input demand;
   wherein the processor is further configured to execute a first remote virtual keyboard application for activating the smart TV into a remote virtual keyboard mode when the smart TV detects a connection of the mobile device via the network;
   wherein when the remote virtual keyboard mode of the smart TV is activated, the first virtual keyboard is hidden on the display screen such that no virtual keyboard is visible on the display screen, while the input column remains displayed on the display screen, and input from a user to the input column of the smart TV is accepted from the second input interface of the mobile device via the mobile device.

2. The smart TV as claimed in claim 1, wherein the second input interface of the mobile device comprises a physical keyboard.

3. The smart TV as claimed in claim 1, wherein the second input interface of the mobile device comprises a second virtual keyboard displayed on a display of the mobile device.

4. The smart TV as claimed in claim 3, wherein a language setting of the second virtual keyboard of the mobile device is different from a language setting of the first virtual keyboard of the smart TV.

5. The smart TV as claimed in claim 3, wherein when the remote virtual keyboard mode of the smart TV is activated, the processor further determines whether there is any other input demand on the smart TV,
   wherein when there is any other input demand, the processor keeps utilizing the mobile device accept input from the user; and
   wherein when there is no other input demand, the processor notifies the mobile device to hide the second virtual keyboard.

6. The smart TV as claimed in claim 1, wherein a second remote virtual keyboard application corresponding to the first remote virtual keyboard application of the smart TV is installed on the mobile device, thereby supporting the remote virtual keyboard mode of the smart TV, wherein when the smart TV and the mobile device connect to each other in the network, the smart TV and the mobile device activate the remote virtual keyboard mode.

7. The smart TV as claimed in claim 1, wherein when the smart TV generates the input column, the smart TV transmits a request signal to the mobile device, wherein when a character is inputted on the smart TV by the mobile device, the mobile device transmits a character signal comprising the inputted character to the smart TV, thereby displaying the inputted character in the input column.

8. The smart TV as claimed in claim 7, wherein the mobile device immediately transmits the character signal of each inputted character to the processor, respectively.

9. The smart TV as claimed in claim 1, wherein when a string is inputted on the smart TV by the mobile device, the mobile device transmits a string signal comprising the inputted string to the smart TV, thereby displaying the inputted string in the input column.

10. The smart TV as claimed in claim 1, wherein when the mobile device does not exist in the network for being connected to the smart TV or does not support the remote virtual keyboard mode of the smart TV and there is the input demand, the processor directly displays the first virtual keyboard for accepting input from the user.

11. The smart TV as claimed in claim 1, wherein the smart TV further comprises a remote controller configured to control and operate the first input interface.

12. The smart TV as claimed in claim 1, wherein the smart TV comprises:
   a set-top box comprising the processor and the network interface; and
   a TV configured to display the input column and the first input interface, wherein the TV connects to the set-top box via a display interface.

13. An input operation method applied in a smart TV, the method comprising:
   utilizing the smart TV to execute a first remote virtual keyboard application to generate a first input interface displayed on a display screen of the smart TV comprising a first virtual keyboard when the smart TV generates an input column in response to an input demand;
   connecting the smart TV to a mobile device via a network;
   determining whether a second remote virtual keyboard application corresponding to the first remote virtual keyboard application is installed on the mobile device;
   activating a remote virtual keyboard mode of the smart TV and the mobile device when the mobile device executes the second remote virtual keyboard application;
   when the remote virtual keyboard mode of the smart TV and the mobile device is activated, hiding the first virtual keyboard on the display screen of the smart TV such that no virtual keyboard is visible on the display screen, while the input column remains displayed on the display screen; and
   accepting input from a user to the input column of the smart TV from a second input interface of the mobile device via the mobile device.

14. The method as claimed in claim 13, wherein the second input interface is a physical keyboard of the mobile device.

15. The method as claimed in claim 13, wherein when the remote virtual keyboard mode of the smart TV and the mobile device is activated, a second virtual keyboard is displayed on a display of the mobile device.

16. The method as claimed in claim 15, further comprising:
   when the remote virtual keyboard mode of the smart TV is activated, determining whether there is any other input demand on the smart TV,
   when there is any other input demand, utilizing the mobile device to accept input from the user; and
   when there is no other input demand, notifying the mobile device to hide the second virtual keyboard.

17. The method as claimed in claim 13, wherein the second remote virtual keyboard application corresponding to the first remote virtual keyboard application is installed on the mobile device to support the remote virtual keyboard mode of the smart TV, and the method further comprises:
   when the smart TV and the mobile device connect to each other in the network, activating the remote virtual keyboard mode of the smart TV and the mobile device.

18. The method as claimed in claim 13, further comprising:
when the smart TV generates the input column, utilizing the smart TV to transmit a request signal to the mobile device; and
when a character is inputted on the smart TV by the mobile device, utilizing the mobile device to transmit a character signal comprising the inputted character to the smart TV, thereby displaying the inputted character in the input column.

19. The method as claimed in claim 18, wherein the step of transmitting the character signal to the smart TV further comprises:
utilizing the mobile device to immediately transmit the character signal of each inputted character to the smart TV, respectively.

20. The method as claimed in claim 13, further comprising:
when a string is inputted on the smart TV by the mobile device, utilizing the mobile device to transmit a string signal comprising the inputted string to the smart TV, thereby displaying the inputted string in the input column.

21. The method as claimed in claim 13, further comprising:
when the mobile device does not exist in the network for being connected to the smart TV or does not support the remote virtual keyboard mode of the smart TV and there is the input demand, directly displaying the first virtual keyboard for accepting input from the user.

22. The method as claimed in claim 13, wherein the step of connecting the smart TV to the mobile device via the network further comprises:
determining whether the mobile device exists in the network; and
when the mobile device exists in the network, connecting the smart TV to the mobile device via the network.

23. The method as claimed in claim 13, wherein a language setting of the second virtual keyboard of the mobile device is different from a language setting of the first virtual keyboard of the smart TV.

24. The method as claimed in claim 13, further comprising:
utilizing a remote controller to control and operate the first input interface of the smart TV.

25. The method as claimed in claim 13, wherein the smart TV comprises:
a set-top box comprising:
a processor configured to execute the first remote virtual keyboard application; and
a network interface configured to connect the smart TV to the mobile device via the network; and
a TV, configured to display the input column and the first input interface, wherein the TV connects to the set-top box via a display interface.

26. A smart TV system: comprising:
a smart TV comprising a display screen, a network interface configured to connect to a network, and a first processor, the processor configured to generate a first input interface on the display screen comprising a first virtual keyboard when the smart TV generates an input column displayed on the display screen in response to an input demand; and
a mobile device, comprising a second processor and connected to the smart TV via the network;
wherein the first processor is further configured to execute a first remote virtual keyboard application for activating the smart TV into a remote virtual keyboard mode when the smart TV detects a connection of the mobile device via the network;
wherein the second processor is configured to execute a second remote virtual keyboard application corresponding to the first remote virtual keyboard application to support the remote virtual keyboard mode of the smart TV; and
wherein when the remote virtual keyboard mode of the smart TV and the mobile device is activated, the first virtual keyboard is hidden on the display screen such that no virtual keyboard is visible on the display screen, while the input column remains displayed on the display screen, and input from a user to the input column of the smart TV is accepted from the second input interface of the mobile device via the mobile device.

27. The smart TV system as claimed in claim 26, wherein when the smart TV generates the input column, the smart TV transmits a request signal to the mobile device, wherein when a character is inputted on the smart TV by the mobile device, the mobile device transmits a character signal comprising the inputted character to the smart TV, thereby displaying the inputted character in the input column.

28. The smart TV system as claimed in claim 26, wherein when a string is inputted on the smart TV by the mobile device, the mobile device transmits a string signal comprising the inputted string to the smart TV, thereby displaying the inputted string in the input column.

29. The smart TV system as claimed in claim 26, wherein when the mobile device does not exist in the network for being connected to the smart TV or does not support the remote virtual keyboard mode of the smart TV and there is the input demand, the first processor directly displays the first virtual keyboard for accepting input from the user.

30. The smart TV system as claimed in claim 26, wherein the smart TV further comprises:
a set-top box comprising the network interface and the first processor; and
network; and
a TV comprising the display screen, configured to display the input column and the input interface, wherein the TV connects to the set-top box via a display interface.

31. An input operation method applied in a smart TV system comprising a smart TV and a mobile device, the method comprising:
utilizing the smart TV to execute a first remote virtual keyboard application to generate a first input interface displayed on a display screen of the smart TV comprising a first virtual keyboard when the smart TV generates an input column in response to an input demand;
connecting the smart TV to a mobile device via a network;
determining whether a second remote virtual keyboard application corresponding to the first remote virtual keyboard application is installed on the mobile device;
activating a remote virtual keyboard mode of the smart TV and the mobile device when the mobile device executes the second remote virtual keyboard application;
when the remote virtual keyboard mode of the smart TV and the mobile device is activated, hiding the first virtual keyboard on the display screen of the smart TV such that no virtual keyboard is visible on the display screen, while the input column remains displayed on the display screen; and accepting input from a user to the input column of the smart TV from a second input interface of the mobile device via the mobile device.

32. The method as claimed in claim 31, further comprising:
when the smart TV generates the input column, utilizing the smart TV to transmit a request signal to the mobile device; and
when a character is inputted on the smart TV by the mobile device, utilizing the mobile device to transmit a character signal comprising the inputted character to the smart TV, thereby displaying the inputted character in the input column.

33. The method as claimed in claim 31, further comprising:
when a string is inputted on the smart TV by the mobile device, utilizing the mobile device to transmit a string signal comprising the inputted string to the smart TV, thereby displaying the inputted string in the input column.

34. The method as claimed in claim 31, further comprising:
when the mobile device does not exist in the network for being connected to the smart TV or does not support the remote virtual keyboard mode of the smart TV and there is the input demand on the smart TV, utilizing the smart TV to directly display the first virtual keyboard for accepting input from the user.

35. The method as claimed in claim 31, wherein the smart TV comprises:
a set-top box, comprising:
a processor configured to execute the first remote virtual keyboard application; and
a network interface configured to connect the smart TV to the mobile device via the network; and
a TV comprising the display screen, configured to display the input column and the input interface, wherein the TV connects to the set-top box via a display interface.

36. A mobile device, used to match a smart TV comprising a display screen, a first virtual keyboard and a first remote virtual keyboard application for activating a remote virtual keyboard mode, the mobile device comprising:
a first network interface, configured to connect the mobile device to the smart TV via a network;
a second remote virtual keyboard application, corresponding to the first remote virtual keyboard application of the smart TV;
a first processor, configured to execute the second remote virtual keyboard application to activate a remote virtual keyboard mode of the mobile device corresponding to the remote virtual keyboard mode of the smart TV;
a second input interface;
wherein when the respective remote virtual keyboard mode of the mobile device and the smart TV is activated, the first virtual keyboard is hidden on the display screen such that no virtual keyboard is visible on the display screen, while the input column remains displayed on the display screen, and input from a user to the input column of the smart TV is accepted from the second input interface of the mobile device via the mobile device.

37. The mobile device as claimed in claim 36, wherein the second input interface of the mobile device comprises a second virtual keyboard configured to replace the first virtual keyboard of the smart TV.

38. The mobile device as claimed in claim 36, wherein the second input interface of the mobile device comprises a keyboard configured to replace the first virtual keyboard of the smart TV.

39. The mobile device as claimed in claim 36, wherein the smart TV comprises:
a set-top box comprising:
a second processor configured to execute the first remote virtual keyboard application; and
a second network interface configured to connect the smart TV to the mobile device via the network; and
a TV comprising the display screen, configured to display the input column and the input interface in response to the input demand, wherein the TV connects to the set-top box via display interface.

40. An input operation method applied in a mobile device, wherein the mobile device matches a smart TV comprising a display screen, a first virtual keyboard and a first remote virtual keyboard application for activating a remote virtual keyboard mode, the method comprising:
connecting the mobile device to the smart TV via a network;
utilizing the mobile device to execute a second remote virtual keyboard application corresponding to the first remote virtual keyboard application for activating a remote virtual keyboard mode of the mobile device corresponding to the remote virtual keyboard mode of the smart TV;
determining whether the respective remote virtual keyboard mode of the mobile device and the smart TV is activated;
determining whether there is an input demand on the smart TV; and
when there is the input demand on the smart TV, hiding the first virtual keyboard on the display screen of the smart TV such that no virtual keyboard is visible on the display screen, while the input column remains displayed on the display screen; and
accepting input from a user to the input column of the smart TV from a second input interface of the mobile device via the mobile device.

41. The method as claimed in claim 40, wherein the second input interface of the mobile device comprises a keyboard configured to replace the first virtual keyboard of the smart TV.

42. The method as claimed in claim 40, wherein the second input interface of the mobile device comprises a second virtual keyboard configured to replace the first virtual keyboard of the smart TV.

43. The method as claimed in claim 40, wherein the smart TV comprises:
a set-top box, comprising:
a processor configured to execute the first remote virtual keyboard application; and
a network interface configured to connect the smart TV to the mobile device via the network; and
a TV comprising the display screen, configured to display the input column and the input interface, wherein the TV connects to the set-top box via a display interface.

* * * * *